April 4, 1939.  R. S. SANFORD  2,152,975
HOSE COUPLING
Filed Sept. 16, 1936
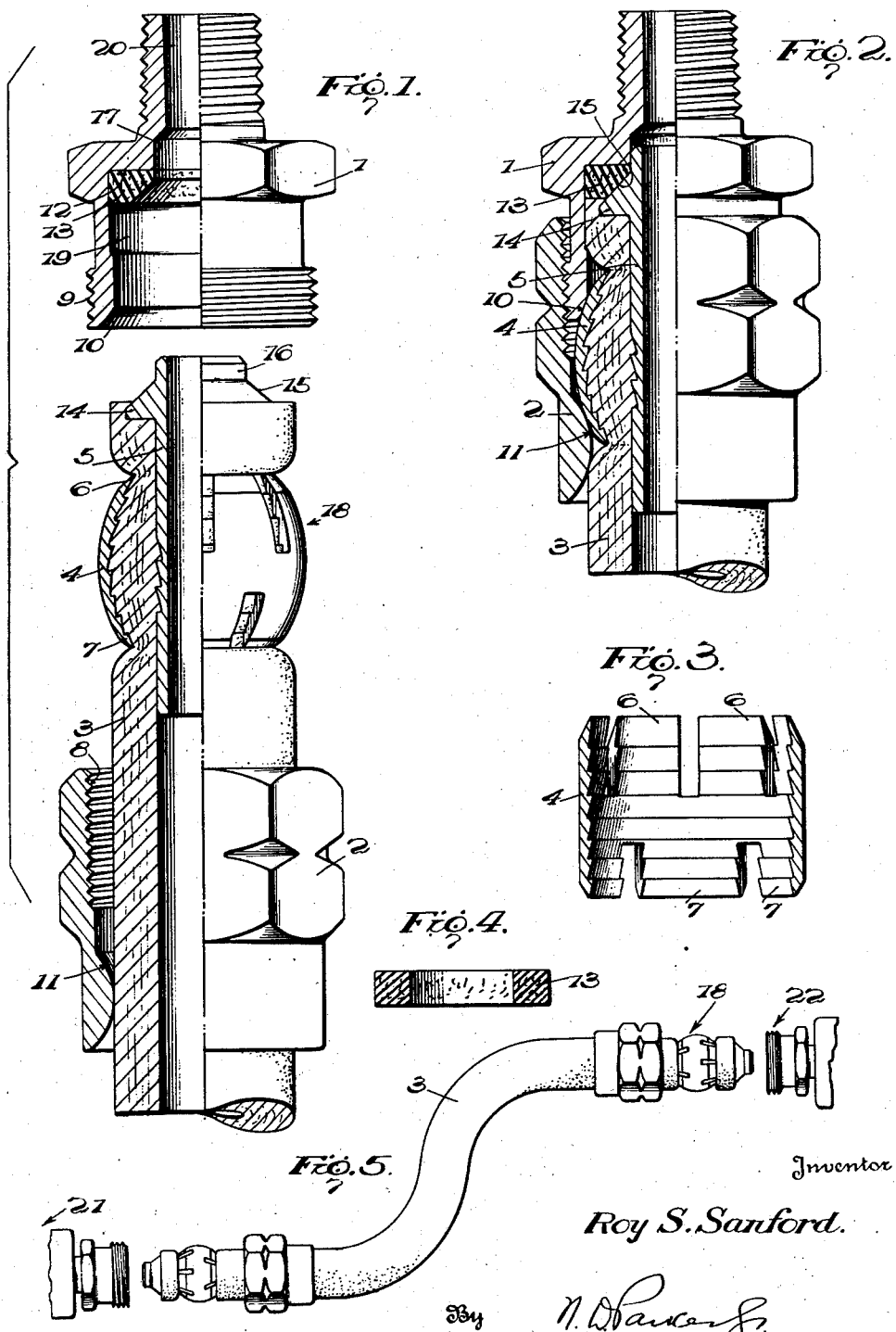
Inventor
Roy S. Sanford.
By N. D. Parker Jr.
Attorney Patented Apr. 4, 1939

2,152,975

UNITED STATES PATENT OFFICE 2,152,975

HOSE COUPLING

Roy S. Sanford, Pittsburgh, Pa., assignor to Bendix-Westinghouse Automotive Air Brake Company, Pittsburgh, Pa., a corporation of Delaware Application September 16, 1936, Serial No. 101,130

1 Claim. (Cl. 285—86)

This invention relates to couplings for flexible conduits and more particularly to couplings of the type adapted for detachable connection as regards the component parts thereof.

There have been proposed heretofore two general classes of couplings especially adapted for flexible conduits, namely, a pressed-on or permanently attached type and a detachable or renewable type. In the first class, the general characteristic of such couplings is that of permanence to the extent that once the fitting has been associated with the end of the flexible conduit, it is impossible to detach the parts without destroying some essential part of the fitting and thus rendering the coupling incapable of re-use. As regards couplings of the second class, the distinguishing feature thereof is that of detachability. Generally, the couplings of this class are so constituted that the various parts may be readily connected and disconnected without seriously impairing the effectiveness of the seal between the parts thereof.

In couplings of the detachable type heretofore proposed, difficulties have been encountered in ensuring that the seal between the parts thereof is maintained efficient and tight notwithstanding repeated connections and disconnections over a long period of time. Various proposals have been heretofore made for maintaining efficient seals, but for the most part they have tended to complicate the coupling structure by the great number of parts required to be assembled each time the coupling parts are connected.

It is accordingly one of the objects of the present invention to provide a novel detachable coupling embodying relatively few parts and capable of rapid assembly and disassembly.

Another object of the invention is to provide, in a coupling of the above type, a novel combined conduit reinforcing and end-sealing member which forms not only an efficient and rigid internal support for the conduit end associated with the coupling but also constitutes an essential part of the necessary seal between the coupling parts.

Still another object is to reduce the number of operations required for connecting or disconnecting the coupling parts without impairing the sealing efficiency of the fitting as a whole.

A further object is to increase the effectiveness of the fluid-tight seal between the coupling parts without the necessity of increasing the force required to assemble the coupling, thus avoiding the possibility of breaking any of the parts.

A still further object is to provide a coupling of relatively few parts, capable of economy of manufacture and possessing the advantage of maintaining an effective seal irrespective of repeated connections and disconnections.

Further objects and novel features of the invention will appear more fully hereinafter from the following detailed description of the invention when taken in connection with the accompanying drawing, wherein a preferred form of the invention is illustrated. It is to be expressly understood, however, that the drawing is employed for purposes of illustration only and is not designed as a definition of the limits of the invention, reference being had for this purpose to the appended claim.

In the drawing, wherein similar reference characters refer to similar parts throughout the several views:

Fig. 1 is a side view, partly in section, of a coupling constructed in accordance with the present invention and illustrating the coupling in disconnected condition;

Fig. 2 is a view similar to Fig. 1 except that the parts are shown in connected condition;

Fig. 3 is a side view of the compression sleeve prior to contraction;

Fig. 4 is an axial sectional view of the sealing gasket employed, and

Fig. 5 is a side view of a typical flexible conduit installation wherein the end couplings are constructed in accordance with the present invention.

Referring more particularly to Fig. 1, a coupling constructed in accordance with the principles of the present invention is illustrated therein as being constituted by a body member 1 adapted to threadedly receive a shell or coupling nut 2 surrounding an end portion 3 of a flexible conduit for the purpose of connecting the conduit with the body member in fluid-sealing relation.

As illustrated in Fig. 1, the end of the conduit is interiorly reinforced by a rigid reinforcing member or sleeve 5 and the conduit end is firmly compressed about the sleeve 5 by means of a compression sleeve 4 surrounding the conduit end and permanently contracted around the same.

The compression sleeve prior to contraction is illustrated in Fig. 3 and, as shown, includes a plurality of oppositely-extending staggered tongues 6 and 7 which are adapted to be contracted as illustrated in Fig. 1 during initial assembly of the coupling parts, as will appear more fully hereinafter.

Upon initial assembly of the coupling parts which includes placing the shell 2 upon the end of the conduit and slipping the compression sleeve 4 on the said end after which sleeve 5 is inserted within the bore of the conduit, the shell 2 is threaded upon the body 1 through the coaction of threads 8 and 9 respectively and, as will appear from Fig. 2, tapered shoulders 10 and 11 provided on the body 1 and shell 2 respectively serve to cooperate with the tongues 6 and 7 of the compression sleeve to force the latter inwardly in order that the compression sleeve be firmly embedded within the outer wall of the conduit. This action serves, moreover, to firmly compress the conduit about the interior reinforcing sleeve 5. After this initial operation, the coupling parts may be disassembled, as illustrated in Fig. 1, it being observed that the compression sleeve 4 and the supporting sleeve 5 are thereafter permanently associated with the end of the conduit.

One of the features of the present invention resides in the provision of means for effectively sealing the end of the conduit with the coupling body each time the body and coupling nut are connected. To this end, the body is provided with an end seat 12 against which a flexible annular gasket 13 is positioned, the gasket being initially preferably rectangular in cross-section, as illustrated in Fig. 4. For sealing the conduit end with respect to the gasket 13, the sleeve 5 is provided exteriorly of the conduit with a radially-extending flange 14, said flange being extended axially of the conduit and providing a conical face 15 and a cylindrical portion 16. The conical face 15 is adapted to coact with the gasket 13 while the cylindrical portion 16 is adapted to be guided into and received by a bore 17 provided in the coupling body, as illustrated in Fig. 2.

In connecting the coupling parts after the permanent contraction of the sleeve 4 about the end of the conduit, the conduit end thus assembled and denoted by reference numeral 18 is inserted within bore 19 of the coupling body 1, and shell 2 is threaded upon said body. During this operation, the entire assembly 18 is forced upwardly, as viewed in Fig. 2, and the conical face 15 of the flanged extension 14 coacts with the lower annular edge of the gasket 13. In view of the shape of the face 15 and the initial contact thereof with the gasket 13, it will be observed that an appreciable wedging or camming action is effected during upward movement of the assembly 18 to the end that the gasket 13 is compressed with a considerable force and is deformed to the shape shown in Fig. 2. There it will be observed that the area of contact between the face 15 and the gasket is considerable and it will also be understood that in view of the wedging action referred to above, such contact constitutes an extremely effective fluid-tight seal. The cylindrical extension 16 during the final stage of upward movement of the assembly 18 with respect to the coupling body is guided into and is received within the bore 17, thus generally centering the coupling parts with relation to one another and aligning the bore of the sleeve 5 with bore 20 of the body member 1.

It will be observed that the flanged extension 14 of the sleeve 5 is of such diameter that it is readily received within the bore 19 of the body member and, moreover, forms an effective end support for the extreme end of the conduit 3. It will also be observed that during the assembling operation, the force moving the conduit assembly 18 upwardly within the body member is transmitted by the compression sleeve 4 to flanged extension 14 through a portion of the flexible conduit, thus forming in effect a resilient connection, and such an arrangement avoids the possibility of breaking any of the rigid parts of the coupling.

In Fig. 5, there is illustrated a typical installation of a flexible conduit structure embodying a pair of couplings constructed in accordance with the present invention. It is desired to point out that in an installation of this character, when the conduit 3 is worn or otherwise unfit for service, it is not necessary to scrap the conduit together with all the coupling parts. It is only necessary to provide a new conduit section with new interior supporting sleeves and compression sleeves. Conduit sections so equipped may be thus associated with the coupling nuts 2 associated with the old conduit and the new section may be used as heretofore in connection with the body members 1 which have been permanently associated with some stationary equipment such as that indicated diagrammatically at 21 and 22. With such an arrangement, the new section of conduit may be readily attached to the body members 1 without the necessity of employing flanged unions or swivel connections in the conduit section.

There has thus been provided by the present invention a conduit coupling of the detachable type which comprises relatively few parts and one which may be readily connected and disconnected with the assurance that the coupling will provide an efficient seal at all times. The use of the interior supporting sleeve for the conduit end provides a rigid support for the conduit in order that crushing of the same is completely avoided. The permanent association of the compression sleeve about the conduit end enables the coupling to be connected and disconnected by merely screwing or unscrewing the coupling nut with relation to the body member. The effectiveness of the seal is considerably enhanced by the end seal provided and which is constituted by the cooperation between the annular gasket and the tapered flanged portion provided upon the interior supporting sleeve.

While only one embodiment of the invention has been illustrated herein, it will be readily understood by those skilled in the art that various changes may be resorted to without departing from the spirit of the invention. Reference will, therefore, be had to the appended claim for a definition of the limits of the invention.

What is claimed is:

In combination with a coupling body member having a seat, an annular gasket of rectangular cross-section positioned on said seat, a tubular reinforcing sleeve positioned within the end portion of a flexible conduit and having a tapered end portion disposed exteriorly of said conduit, a compression sleeve permanently contracted around the end portion of said conduit for compressing the latter and effecting sealing engagement of the inner wall thereof with the tubular portion of said reinforcing sleeve, and a nut loosely surrounding said end portion of the conduit, said nut threaded to said body member and cooperating with said compression sleeve for forcing said conduit end and reinforcing sleeve into said member for effecting sealing engagement between the gasket and the tapered end portion of said reinforcing sleeve, the contact between the tapered portion of the sleeve and the gasket deforming the latter through the wedging action between these two parts.

ROY S. SANFORD.